Patented June 4, 1935

2,003,711

UNITED STATES PATENT OFFICE 2,003,711

METHOD OF TREATING LEAD SULPHIDE MINERAL

Fred E. Gregory, Galena, Kans., and Raymond L. Hallows, Joplin, Mo., assignors to The Eagle-Picher Lead Company, Cincinnati, Ohio, a corporation of Ohio No Drawing. Application May 6, 1933, Serial No. 669,798

6 Claims. (Cl. 23—134)

The object of our invention is the removal of iron and iron compounds, other than sulphides, from the surface and the interstices of lead sulphide mineral. Another object of our invention is to devise a method for satisfactorily carrying out the removal of iron and iron compounds, other than sulphides, from the surface and interstices of lead sulphide mineral. A further object is the production of lead sulphide mineral wholly free on the surface and interstices from iron and iron compounds, other than sulphides. A still further object is the production of a lead sulphide mineral of the highest degree of purity. A still further object is the provision of a continuous step by step method of removing iron and iron compounds, other than sulphides, from the surface and interstices of lead sulphide minerals.

Further objects are to provide a method of maximum simplicity, efficiency, economy of operation and such further objects, advantages and capabilities as will later more fully appear and are inherently possessed thereby.

Many attempts have been made to manufacture basic sulphate of lead as a commercial product directly from natural lead sulphide mineral, by the introduction of finely divided lead sulphide mineral into a heated zone, and the collection of the resulting fume. Such resultant product has heretofore been of a most unsatisfactory color which renders it unmarketable as a white pigment. We have determined that the cause of this unsatisfactory color is due to the presence of iron and iron compounds in association with the natural lead sulphide mineral. Heretofore it has been impossible to remove the iron and iron compounds from natural lead sulphide mineral to a degree by which we mean .013 per cent or less which will permit its use as raw material for such a process.

Lead sulphide mineral, as found in nature, is associated with various iron compounds which may consist of the various iron sulphides, carbonates, oxides and other iron-bearing minerals. Such lead sulphide mineral, after concentration, also contains a small percentage of metallic iron artificially introduced by milling processes. These iron-bearing substances as contained in the lead sulphide mineral, in processes of mining and milling, may undergo changes due to oxidation and subsequent hydrolysis. As originally present, or as altered by subsequent oxidation, they adhere to or are admixed with the lead sulphide mineral, and cannot be wholly removed by the processes of flotation and require a separate method for their removal, which we have discovered as new and novel and very efficacious.

The process which we have developed and claim as new is that of rendering soluble and removing in solution the iron and iron compounds, other than iron sulphides, which are present, through a treatment of the lead sulphide mineral with dilute mineral acids. It is understood that, in the event iron is present as sulphide, such iron sulphide will be removed by ore-dressing methods, either prior or subsequent to treatment by our method.

While we know that dilute mineral acids, such as sulphuric acid, hydrochloric acid, and nitric acid, either with or without the addition of salts of these acids, are all more or less efficacious, and it is our desire to include all such mineral acids and salts in this process, we have found that this process of treatment for the removal of such iron and iron compounds can be well carried out by the following method, which is merely cited as an illustration.

The ore is first introduced into a tank. Water is added to form a slurry and the whole agitated by any suitable means. The slurry may or may not be heated, it being understood that the subsequent chemical action is accelerated by heating, though such heating is not necessary. Sulphuric acid, together with a small amount of sodium chloride, is added to the slurry during stirring, the amount of acid and sodium chloride added being dependent upon the quantity of iron and iron compounds present, since it is obvious that a varying quantity of sulphuric acid and sodium chloride must be used for varying quantities of iron and iron compounds. The addition of sodium chloride to the slurry is not essential, but its presence is advantageous, in that it accelerates the reaction by shortening the time of treatment. However, when present, the amount of sodium chloride should be kept at a minimum because of the solvent action of the sulphuric acid and sodium chloride mixture upon the lead sulphide mineral itself, the object being not to dissolve lead sulphide mineral, in any quantity but to remove the iron and iron compounds from the lead sulphide mineral, it being plainly evident that recoveries will be lowered in the event any appreciable amount of lead sulphide is dissolved. The agitation is continued to permit the lapse of sufficient time to complete the removal of the iron and iron compounds and leave the lead sulphide mineral free and clean of such iron and iron compounds.

In the second place, the ore is discharged from the agitation tank into a suitable washing device, wherein the clean lead sulphide mineral is separated from the iron-bearing liquors and subsequently washed with water for the complete removal of the iron-bearing liquor.

The lead sulphide mineral in a highly purified state is then available for any of the ordinary processes of treatment wherein such a highly purified lead sulphide mineral is essential.

We have found that the method herein described produces a lead sulphide mineral free from undesirable iron contamination, and produces a product of the desired purity.

Having thus disclosed our invention we claim:

1. The herein described method of removing iron and iron compounds, other than iron sulphides, from the surface and interstices of lead sulphide mineral, which consists in treating lead sulphide mineral by means of an acid selected from the group consisting of sulphuric acid, hydrochloric acid or nitric acid.

2. The herein described method of removing iron and iron compounds, other than iron sulphides, from the surface and interstices of lead sulphide mineral, which consists in treating lead sulphide mineral by means of an acid selected from the group consisting of sulphuric acid, hydrochloric acid or nitric acid, to which has been added a salt of a mineral acid.

3. The herein described method of purifying lead sulphide mineral by treating same with dilute mineral acids, and removing the iron bearing liquors from contact with the lead sulphide mineral by washing with water.

4. The method of purifying lead sulphide mineral by treating same with dilute mineral acids, to which has been added a salt of a mineral acid, and removing the iron bearing liquors from contact with the lead sulphide mineral by washing with water.

5. The step by step process of removing iron and iron compounds, other than iron sulphides, from the surface and interstices of lead sulphide mineral which comprises treating lead sulphide mineral with dilute mineral acid selected from the group consisting of sulphuric acid, hydrochloric acid or nitric acid and removing the iron bearing liquors from contact with the lead sulphide mineral by washing with water.

6. The step by step process of removing iron and iron compounds, other than iron sulphides, from the surface and interstices of lead sulphide mineral which comprises treating lead sulphide mineral with dilute mineral acid selected from the group consisting of sulphuric acid, hydrochloric acid, or nitric acid to which has been added a salt of a mineral acid and removing the iron bearing liquors from contact with the lead sulphide mineral by washing with water.

F. E. GREGORY.
RAYMOND L. HALLOWS.